A. S. MOORE.
BEET HARVESTING MACHINE.
APPLICATION FILED MAY 23, 1914.
1,130,922.
Patented Mar. 9, 1915.
3 SHEETS—SHEET 1.
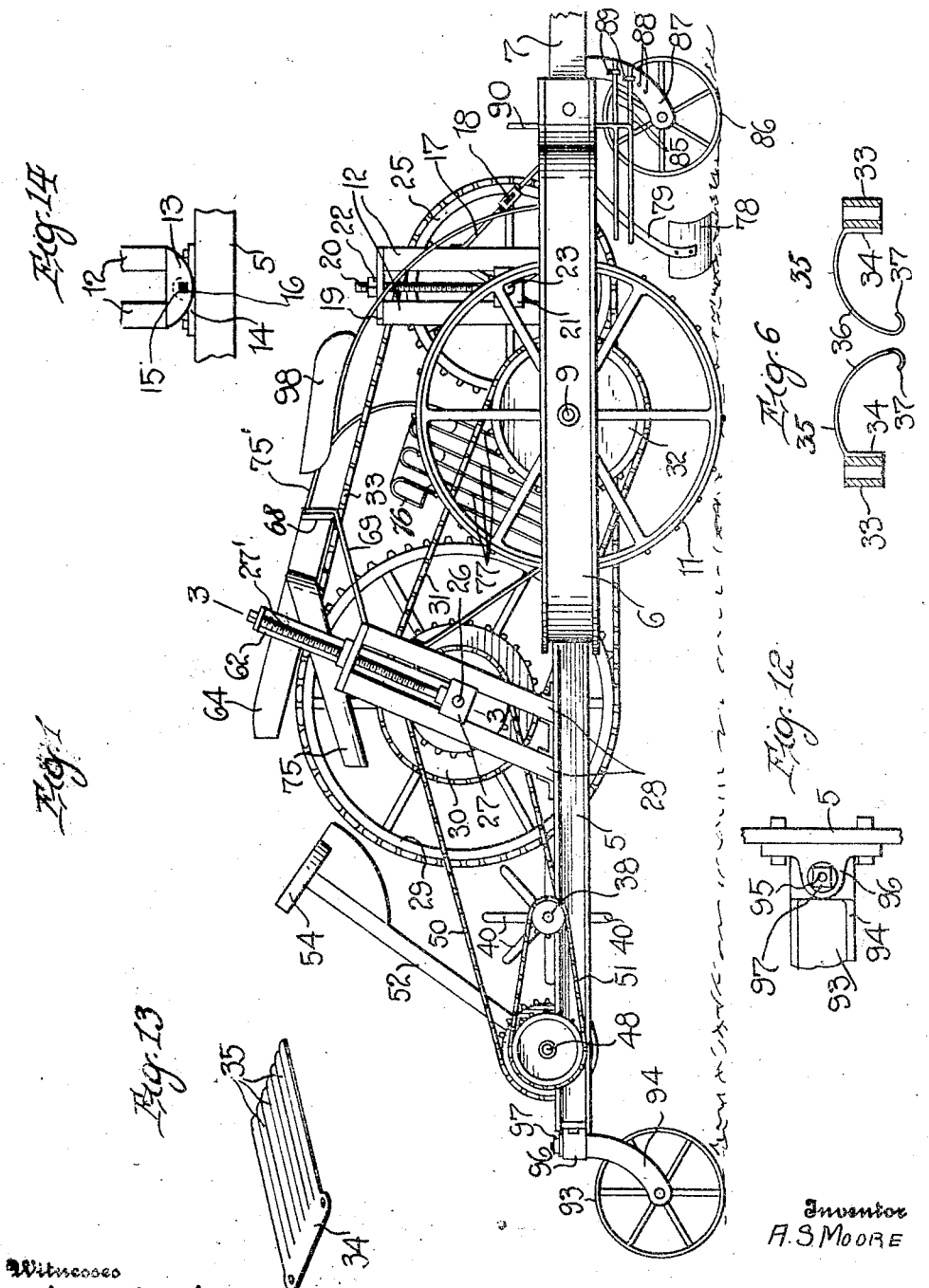
Inventor
A. S. MOORE
Witnesses
Robert M. Sutphen
A. J. Hind
By Watson E. Coleman
Attorney

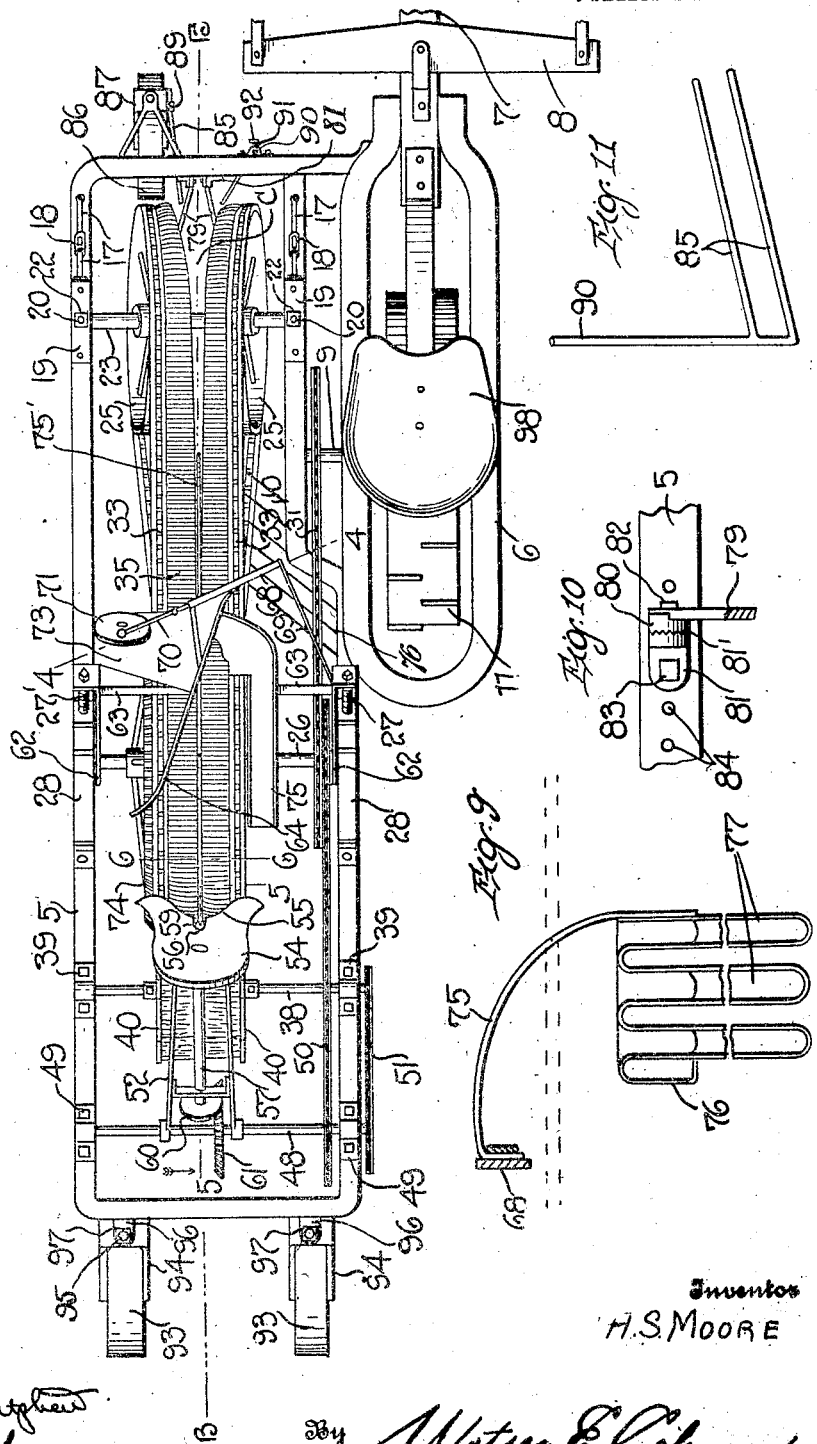

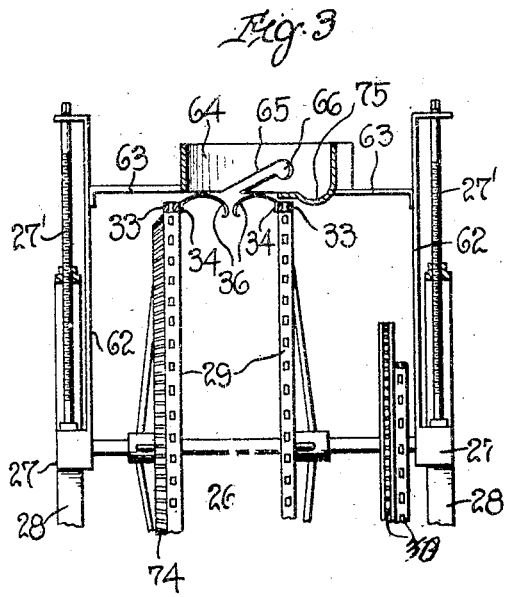
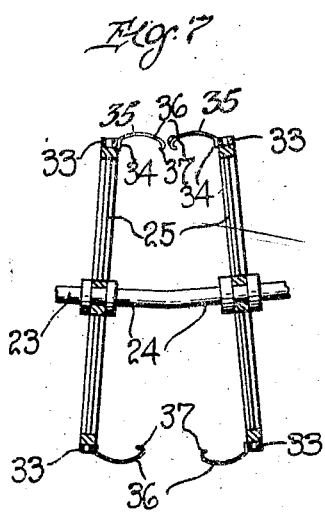
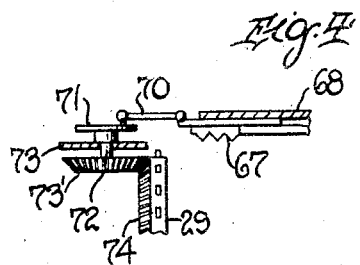
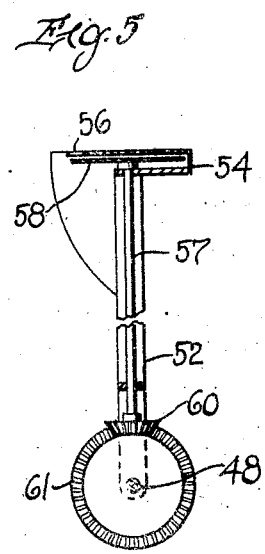
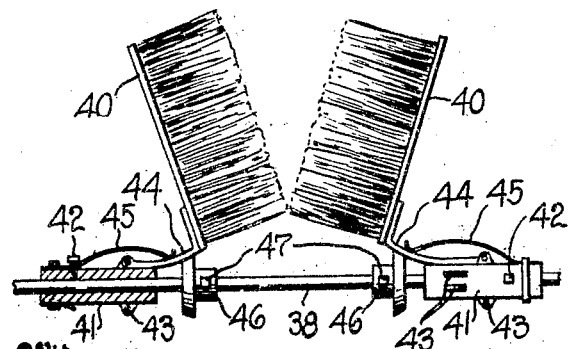

UNITED STATES PATENT OFFICE.

ALBERT S. MOORE, OF SAULT STE. MARIE, ONTARIO, CANADA.

BEET-HARVESTING MACHINE.

1,130,922. Specification of Letters Patent. Patented Mar. 9, 1915.

Application filed May 23, 1914. Serial No. 840,570.

*To all whom it may concern:*

Be it known that I, ALBERT S. MOORE, a citizen of the United States, residing at Sault Ste. Marie, in the Province of Ontario and Dominion of Canada, have invented certain new and useful Improvements in Beet-Harvesting Machines, of which the following is a specification, reference being had to the accompanying drawings.

This invention relates to beet harvesting machines, and has for its primary object to provide a simple, novel, and efficient mechanism for automatically severing the roots from the beets, and subsequently cutting off the tops or leaves as the machine moves over the ground.

The invention has for a more particular object to provide means for loosening the soil around the beets, and traveling articulated grippers to engage the beet stalk and pull the same from the ground.

The invention has for an additional object to provide spaced endless carriers each having closely arranged resilient gripping fingers, relatively stationary means mounted above the carriers to receive the beet top, a cutter to sever the top, and means for subsequently removing the tops from the resilient gripping fingers of the carriers.

The invention has for a still further object to produce a machine of the above character which consists of comparatively few parts simply formed and capable of manufacture at a small cost, said machine requiring practically no attention on the part of the driver, and operating to quickly harvest a large field of beets and deliver the same in marketable condition.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a side elevation of a beet harvesting machine constructed in accordance with the preferred embodiment of my invention; Fig. 2 is a top plan view thereof; Fig. 3 is a section taken on the line 3—3 of Fig. 1; Fig. 4 is a section taken on the line 4—4 of Fig. 2; Fig. 5 is a section taken on the line 5—5 of Fig. 2; Fig. 6 is an enlarged detail section taken on the line 6—6 of Fig. 2; Fig. 7 is a detail elevation illustrating the mounting of the forward sprocket wheels for the endless carriers; Fig. 8 is an enlarged detail view showing the arrangement of the brushes and the means for adjusting the same; Fig. 9 is a detail elevation showing the arrangement of the cleaning bar with respect to the endless carriers; Fig. 10 is a fragmentary elevation illustrating the mounting of the hoes or plows; Fig. 11 is a detail perspective view of the guide member; Fig. 12 is a detail view showing the manner of mounting and adjusting the rear supporting wheels. Fig. 13 is a detail perspective view of the blank from which the gripping fingers are formed; Fig. 14 is a detail elevation of certain parts of the machine.

Referring in detail to the drawings, 5 designates the main frame of the machine which is of rectangular form in plan, and is preferably constructed of channel iron bars, though it will, of course, be understood that if desired this frame may be constructed of wood. At the forward end of said frame and upon one side thereof an auxiliary elongated frame 6 is secured, to which the tongue or pole 7 is fixed at its rear end.

8 designates the draft attachments for the animals which are mounted upon this tongue. A forward transverse shaft 9 is journaled in suitable bearings mounted upon the auxiliary frame 6 and the inwardly offset forward end 10 of one of the side bars of the main frame 5. Upon this shaft 9 the traction wheel 11 is fixed, said wheel being disposed between the parallel, longitudinal side bars of the frame 6.

Upon the forward end of each of the side bars of the main frame 5 adjustable guides are mounted. These guides include spaced parallel bars 12 which are secured at their lower ends upon a plate or casting 13 which is of U-shape form in cross section and is designed to receive a bearing lug or ear 14 which is secured to the frame 5. A pivot bolt 15 extends through the U-shaped plate or casting 13 and the ear 14 whereby the guide is connected to said ear for rocking movement thereon. The pivot pin or bolt 15 is, of course, provided with a clamping nut 16 upon one end whereby the guide may be secured in its adjusted position. As an additional securing or bracing means for the guide, I provide the rods indicated at 17 which are secured respectively to one of the bars 12 and the frame 5, and are connected by means of the turn buckle 18. The upper ends of the bars 12 are connected by a cap plate 19 having an opening to receive a threaded rod 20. The lower end of this rod is connected to a bearing member 21 mounted for sliding movement upon the bars 12. A nut 22 is threaded upon the upper end of the rod 20, and it will be obvious that by simply turning this nut, the rod 20 may be moved through the plate 19 and the bearing 21 raised or lowered as desired. In the adjustable bearing members 21 the ends of a stationary transverse shaft or axle 23 are fixed. This axle is bent intermediate its ends to provide the oppositely inclined portions 24. Upon these inclined portions of the axle 23 the sprocket wheels 25 are loosely mounted to rotate. A second transverse shaft or axle 26 is also mounted at the approximate center of the frame 5 in the adjustable bearings 27. These bearings are adjusted with respect to the guides 28 in which the same are mounted in the same manner as the forward bearings 21, though the guides 28 are fixed upon the longitudinal frame bars and are not adjustable with relation thereto. Upon the shaft or axle 26 the spaced sprocket wheels 29 are secured. The spokes of these sprocket wheels are outwardly inclined so that they will not interfere with the free movement or travel of the beets to be hereinafter referred to. The shaft 26 is equipped with an additional sprocket wheel 30 which is connected by an endless drive chain 31 to a similar sprocket wheel 32 which is secured upon the traction wheel shaft 9. The corresponding front and rear sprocket wheels 25 and 29 are connected by the endless chains 33. These chains are of the ordinary link type and to each of the outer link plates on the inner edge of the chain, a sheet-steel plate 34 is secured. This plate is longitudinally cut or slit to provide a plurality of resilient gripping fingers 35, said gripping fingers being upwardly and inwardly curved from the attaching plate 34 as indicated at 36 and having their extremities sharply bent in a reverse or outward direction as at 37. In this manner it will be seen that there is provided upon each of the chains, what is in effect, a continuous articulated resilient gripper, the inner free ends 37 of the spring fingers carried by the respective chains being disposed contiguous to each other and spaced just a sufficient distance apart so as to admit of the uninterrupted movement of the chains. It will be apparent that by simply adjusting the forward bearing guides upon the supporting ears or lugs 14, the sprocket chains 33 may be properly tightened so that the spring gripping fingers 35 will engage the beet stalks and pull the same from the ground in the forward movement of the machine, which operation will be later more fully referred to. A transverse shaft 38 is journaled in bearings 39 on the side bars of the frame 5, said shaft being arranged rearwardly of the sprocket wheels 29. Upon this shaft 38 opposed brushes are adjustably mounted. Each of these brushes includes a plurality of relatively movable, yieldably held brush sections 40.

41 designates a sleeve or hub which is longitudinally adjustable upon the shaft 38 and is rigidly held in its adjusted position by means of a setscrew 42. This sleeve is provided upon its periphery with a plurality of pairs of ears 43 which are arranged in staggered relation. Between each pair of ears one end of an arm 44 is pivotally mounted. These arms extend longitudinally upon and project beyond one end of the sleeve, the other ends of said arms being angularly disposed and fixed to the backs of the respective brush sections 40. Leaf springs 45 corresponding in number to the arms 44 are also secured at one of their ends upon the sleeve 41, the other or free end of said springs bearing upon the respective arms 44 and yieldably holding the brush sections against outward movement. By simply sliding the sleeves or hubs 41 upon the shaft 38, the brushes may be adjusted bodily with respect to each other and the individual sections of each brush are held against inward movement toward the corresponding section of the other brush by an adjustable collar 46 which carries the setscrew 47 for binding engagement with the shaft 38. The sections of the respective brushes are angularly disposed with relation to each other by simply adjusting the collar 46 against the pivotally mounted arms 44. Thus it will be obvious that the angle of the brush sections may be changed as circumstances may require.

Upon the rear end of the main frame 5 a transverse shaft 48 is journaled in the bearings 49. This shaft is connected to the shaft 26 by means of an endless drive chain 50 and a chain 51 also connects the shaft 48 to the shaft 38, whereby the cleaning brushes are rotated. Upon the shaft 48 a frame 52 is loosely mounted at its lower end. Upon the upper end of this frame the guard housing 54 is secured, said housing being of substantially sector shape in plan and at its forward end being inwardly curved as indicated at 55. This curved edge of the guard is disposed contiguous to the resilient gripping fingers carried by the chains 33, while the outer side portions of the guard normally rest upon the respective chains which pass over the wheels 29. The guard housing 54, centrally of the curved edge 55 thereof, is formed with a recess or opening indicated at 56.

57 designates a shaft journaled in the frame 52. Upon the upper end of this shaft which is journaled in the guard housing 54 a cutting disk 58 is secured, said disk being provided upon its periphery with cutting teeth 59. These teeth as they pass or traverse the opening or recess 56 engage the roots of the beet and sever the same from the body thereof. The lower end of the shaft 57 is provided with a pinion 60 which meshes with a bevel gear 61 fixed upon the transverse shaft 48. To the upper ends of the adjusting rods 27' for the rear sprocket shaft bearings 27, the vertical bars 62 are secured. The lower ends of these bars are fixed to the respective bearings 27. Upon these adjustable bars 62 the topping mechanism is mounted. The bars 62 are braced by transverse bars 63 upon which a longitudinally-extending, obliquely-inclined plate 64 is supported. This plate is located immediately above the upper stretches of the chains or carriers 33 and extends transversely across the opposed series of gripping fingers 35. The rear end of the plate 64 is preferably curved as shown, and at the forward extremity of said curved portion, the plate 64 is provided with an inclined slot 65 which opens at its rear end upon the lower edge of said plate. The forward end of the slot 65 communicates with an enlarged pocket or recess 66 formed in the plate which is designed to receive the stalks of the beet tops.

67 designates a reciprocatory cutting saw which is mounted in a suitable guard or housing 68 secured upon one end of the plate 64 and braced by means of the inclined bar 69 which is fixed at its outer end to one of the movable bars 62. This saw is actuated through the medium of a pitman 70, the outer end of which is eccentrically connected to a disk 71 mounted upon the upper end of a shaft or arbor 72 journaled in a transversely-disposed plate 73 which is connected to the plate 64, and to one of the bars 62. Upon the lower end of the shaft 72 a bevel pinion 73' is secured which meshes with the bevel gear 74 carried by one of the chain sprocket wheels 29. A beet-receiving chute 75 is connected to one side of the obliquely inclined plate 64 at the opening 66 therein, and is adapted to receive the beets after the tops have been severed and discharge the same upon the ground. It is, of course, understood that the teeth of the saw 67 traverse the opening or pocket 66 in the plate 64 and sever the beet tops which are held therein. In order to remove the beet tops from the gripping fingers 35 in the forward travel of the upper stretches of the chains 33, I provide a bar 75' which is fixed at one of its ends to the guard or housing 68 and is curved forwardly and downwardly between the opposed gripping fingers on the respective chains or carriers.

The lower end of this bar is suitably secured to a directing plate 76 which is bent or convoluted to produce a plurality of troughs or channels indicated at 77. This directing plate is outwardly and rearwardly inclined and has its lower edge suitably secured to one of the side bars of the frame 5.

In order to loosen or disturb the soil around the roots of the beets so that they may be pulled from the ground, I provide adjustable hoes or plows 78. These plows include a beam 79, one end of which is adapted to be fitted into a channel or groove provided in an adjustable clamping disk 80. A bracket member 81 is formed with radially extending ribs upon one of its arms for engagement in corresponding grooves in the face of the disk 80 as indicated at 81'. A bolt 82 extends through an arm of the bracket member and the disk 80, and is provided upon one end with a suitable nut whereby the disk may be clamped upon the bracket in its adjusted position. The bracket member 81 is also transversely adjustable upon the forward bar of the frame 5 and is adapted to be rigidly secured in its adjustable position by the bolt 83 which may be inserted through any one of a series of openings 84 in the transverse frame bar. It will thus be seen that the plows 78 may be vertically and transversely adjusted with respect to the frame so as to position said plows or hoes for proper engagement with the soil adjacent to the beet row. Means are also provided for directing the beet stalks to the forward spaced ends of the lower stretches of the articulated grippers. To this end, I provide the spaced parallel rods 85, the forward ends of which are mounted upon one of the arms of a yoke 87 in which the forward supporting wheel 86 for the frame 5 is journaled. This arm of the yoke is formed with a series of openings 88 to receive the bolts of the spaced clamping devices 89. These clamping devices are of the ordinary type and each includes spaced plates between which the respective rods 85 are adapted to be arranged. These rods 85 are also connected at a point intermediate of their ends by a vertical rod 90 which is adjustable in a guide lug 91 secured upon the forward transverse bar of the frame 5. A setscrew 92 is threaded in said lug for binding engagement against the rod 90. It will thus be seen by the provision of the vertical guide rod 90 and the means for clamping the rods 85 to the yoke 87, the longitudinally directing rods 85 may be rigidly held in their adjusted positions. The frame 5 is also supported at its rear end by the spaced wheels 93, each of which is journaled between arms of a yoke 94. The upper end of this yoke is equipped with a stud axle 95 which is loosely mounted in a bearing 96 secured upon the frame. The wheels 93 may be disposed in various angular positions with respect to the line of travel of the machine and rigidly secured in such adjusted positions by means of the clamping nuts 97 threaded upon the upper ends of the stud axle 95. Upon the rear end of the tongue or pole 7 the driver's seat 98 is mounted.

Having now specifically decribed the construction of the several coöperating parts of my improved beet harvester, its operation will be understood as follows: The machine is properly positioned so that the beet row indicated by the dotted line B—B in Fig. 2 of the drawings is in line with the space C between the forward ends of the traveling grippers or carriers. In the forward movement of the machine, the hoes or plows 78 which have been properly adjusted, loosen or disturb the soil around the roots of the beets and the tops of the beets are directed inwardly into the space C by the parallel rods 85. As the rearwardly converging forward ends of the lower stretches of the carriers engage the opposite sides of the beet stalks, the spring-gripping fingers 35 exert a pressure thereon which is sufficient to securely grip the stalks and pull the beets from the loosened soil. In the continued travel of the machine the beets are carried rearwardly by the lower stretches of the carriers, and as they move around the rear sprockets 29, the beets are drawn upwardly between the opposed sections 40 of the rotating brushes. The beets next engage against the forward inwardly curved edge 55 of the guard housing 64 for the rotating cutter 58 and as the body of the beet is too large to enter the opening or recess 56, the frame 63 will be oscillated upon the shaft 48, the guard 54 being forced upwardly and rearwardly. The attenuated root of the beet, however, will enter the opening or recess 56 and be severed by the teeth of the cutting disk 58. From this root cutter, the beets are carried between the series of resilient gripping fingers over the sprocket wheels 29 and forwardly. The stalks of the beets now enter the open end of the slot 65 in the plate 64, the beet being disposed upon one side of said plate while its foliage or top extends upon the opposite side thereof.

The beet stalks are drawn upwardly into the forward end of the slot 65 and finally bunched together into the opening or pocket 66. The reciprocating saw 67 now severs the beet tops and the beet falls from one side of the plate 64 into the discharging chute 75 from the lower rear end of which it is deposited upon the ground at one side of the beet row. The severed beet tops which remain gripped between the two series of traveling fingers 35 are then removed from said gripping fingers in their continued forward movement by the bar 75', and by said bar are directed into the troughs or channels of the plate 76. The beet tops move downwardly and outwardly in said channels and are deposited upon the ground at one side of the machine and beyond the line of the beets discharged from the chute 75. This operation continues ad infinitum. In this manner it will be seen that the beets may be quickly harvested, cleaned, and the roots and tops removed therefrom so that they are discharged from the machine in a marketable condition. There being an entire absence of levers or other parts to be manipulated by the driver, his entire attention may be directed to the proper driving of the machine across the field. It will also be manifest that as the several elements of the machine are of very simple form, the same will be highly efficient in practical operation and not liable to get out of order.

While I have illustrated in the accompanying drawings the preferred form of the gripping fingers, the brush sections and other parts, it will be understood that the shape and construction of these several elements may be varied as the particular circumstances in the use of the machine may indicate to be desirable or necessary.

While I have above described the preferred form, construction, and arrangement of the several elements employed, it will be understood that the device is, nevertheless, susceptible of considerable modification therein, and I therefore reserve the privilege of resorting to all such legitimate changes as may be fairly embodied within the spirit and scope of the invention as claimed.

What is claimed is:

1. In a beet harvesting machine, opposed traveling grippers adapted to grip the beet stalks in the forward movement of the machine and pull the beets from the ground, means arranged above the grippers to cut the tops from the beets, and relatively stationary means disposed between the traveling grippers at a point intermediate of their ends to remove the beet tops therefrom.

2. In a beet harvesting machine, opposed endless traveling grippers adapted to grip the beet stalks in the forward movement of the machine and pull the beets from the ground, means arranged above the upper stretches of the grippers at a point intermediate of their ends to cut the tops from the beets, and a vertically disposed stationary bar arranged between the opposed grippers to remove the beet tops therefrom.

3. In a beet harvesting machine, opposed endless traveling grippers adapted to grip the beet stalks in the forward movement of the machine and pull the beets from the ground, a reciprocatory cutter arranged above the upper stretches of the grippers intermediate of their ends, and an obliquely disposed stationary element arranged above said grippers to direct the beet tops to said cutter.

4. In a beet harvesting machine, opposed endless traveling grippers adapted to engage the beet stalks in the forward movement of the machine and pull the beets from the ground, a transversely disposed reciprocatory cutter arranged above the upper stretches of said grippers, and an obliquely disposed stationary element provided with means to receive the beet stalks and constrict the same and direct said stalks to the cutter in the movement of the grippers.

5. In a beet harvesting machine, opposed endless traveling grippers adapted to engage the beet stalks in the forward movement of the machine and pull the beets from the ground, brushes arranged at the rear ends of the grippers to engage and clean the beets, means for cutting the roots from the beets, a reciprocating cutter arranged above the traveling grippers to sever the beet tops, and relatively stationary means for directing the beet tops to said cutter.

6. In a beet harvesting machine, opposed endless traveling grippers adapted to grip the beet stalks in the forward movement of the machine and pull the beets from the ground, the beets being carried rearwardly by the lower stretches of the grippers and then forwardly and upwardly upon the upper stretches thereof, cutting mechanism pivotally mounted at the rear end of the grippers to sever the roots from the beets, and additional cutting mechanism arranged above the upper stretches of the grippers to cut the tops from the beets.

7. In a beet harvesting machine, endless traveling carriers provided with a multiplicity of closely arranged spring fingers for resilient gripping engagement upon opposite sides of the beet stalks, an obliquely disposed reciprocatory cutter arranged above the upper stretches of said carriers intermediate of their ends, a stationary element provided with a slot open at one end to receive the beet stalks whereby the same are constricted, said stalks being directed to the cutter by said stationary element in the movement of the carriers, and a vertically disposed stationary bar extending downwardly between the opposed series of gripping fingers to remove the beet tops therefrom.

8. In a beet harvesting machine, endless traveling carriers to mutually engage the beet stalks and carry the same first rearwardly and then forwardly, means arranged at the rear ends of the carriers to sever the roots of the beets, a movable cutting member arranged above the upper stretches of the carriers, and a plate extending obliquely across the carriers, said plate having a slot to receive the beet stalks and direct the same to said cutter whereby the tops are severed from the beets.

9. In a beet harvesting machine, opposed endless carriers each having a series of gripping elements for engagement with the beet stalks, said carriers operating to first carry the beets rearwardly and then upwardly and forwardly, cutting mechanism arranged at the rear ends of the carriers to sever the roots from the beets, said mechanism being mounted for bodily movement with respect to the carriers, cutting mechanism centrally arranged over the upper stretches of the carriers and including a reciprocatory cutting member, relatively stationary means for directing the beet stalks to said cutting mechanism to be severed, means for subsequently removing the beet tops from the gripping members of the carriers, and additional means for adjusting the carriers vertically to position the lower stretches thereof with respect to the ground.

10. In a beet harvesting machine, an endless carrier adapted to receive and convey the beets, first rearwardly and then forwardly, a pivotally-mounted support arranged at the rear end of the carrier, a rotary cutting disk mounted upon said support, a guard for said disk having an opening to receive the beet roots; said support being moved with respect to the carrier by the engagement of the beets with said guard, and means for operating said cutting disk.

11. In a beet harvesting machine, an endless carrier for the beets, a bodily movable rotatably-mounted cutting disk arranged at the rear end of said carrier, the beets being received by said carrier in a forward movement of the machine and first conveyed rearwardly to said cutting disk, means for preventing the engagement of the beet proper by said cutter and directing the root of the beet to the cutter, and additional cutting mechanism arranged above the carrier to cut the tops from the beets in their forward movement.

12. In a beet harvesting machine, an endless carrier adapted to receive the beets and first convey the same rearwardly and then forwardly, a bodily-movable rotatably-mounted cutting disk arranged at the rear of the carrier, a guard therefor with which the beets are adapted to engage and whereby the roots of the beets are directed into engagement with the cutting disks and severed, means for rotating said disk, and additional cutting mechanism arranged above the carrier to subsequently cut the tops from the beets in their forward movement.

13. In a beet harvesting machine, an endless carrier adapted to receive the beets and first convey the same rearwardly and then forwardly, a bodily-movable rotatably-mounted cutting disk arranged at the rear end of the carrier, a guard therefor with which the beets are adapted to engage and whereby the roots of the beets are directed into engagement with the cutting disk and severed, means for rotating said disk, additional cutting mechanism arranged above the carrier to subsequently cut the tops from the beets in their forward movement, and relatively stationary means for removing the beet tops from the carrier.

14. In a beet harvesting machine, a pair of endless carriers each provided with an uninterrupted series of yieldably gripping members, said members on the respective carriers being arranged in opposed relation and adapted for gripping engagement with the beet stalks, means arranged at the rear ends of the carriers to first clean the beets, means for subsequently severing the roots, additional means arranged above the carriers for finally cutting the tops from the beets, a discharge chute to receive the beets and deposit the same upon the ground, a bar extending between the two series of gripping fingers to remove the beet tops therefrom, and means for receiving the beet tops and directing the same downwardly and outwardly from one side of the machine.

In testimony whereof I hereunto affix my signature in the presence of two witnesses.

ALBERT S. MOORE.

Witnesses:
 ROBERT M. FAIR,
 L. M. RAY.